(12) United States Patent
Iwachido

(10) Patent No.: US 10,526,988 B2
(45) Date of Patent: Jan. 7, 2020

(54) CONTROLLING DEVICE FOR PURIFYING EXHAUST GAS PURIFYING

(71) Applicant: MITSUBISHI JIDOSHA KOGYO KABUSHIKI KAISHA, Tokyo (JP)

(72) Inventor: Kinichi Iwachido, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/757,736

(22) PCT Filed: Feb. 2, 2016

(86) PCT No.: PCT/JP2016/053031
§ 371 (c)(1),
(2) Date: Mar. 6, 2018

(87) PCT Pub. No.: WO2017/047109
PCT Pub. Date: Mar. 23, 2017

(65) Prior Publication Data
US 2018/0347492 A1   Dec. 6, 2018

(30) Foreign Application Priority Data

Sep. 16, 2015   (JP) .................................. 2015-182547

(51) Int. Cl.
*F02D 41/12* (2006.01)
*F01N 11/00* (2006.01)
*F02D 41/14* (2006.01)

(52) U.S. Cl.
CPC .......... *F02D 41/123* (2013.01); *F01N 11/002* (2013.01); *F01N 11/007* (2013.01);
(Continued)

(58) Field of Classification Search
CPC ............... F02D 41/123; F02D 41/1441; F02D 41/0295; F02D 41/1454; F02D 41/12;
(Continued)

(56) References Cited

U.S. PATENT DOCUMENTS 4,437,304 A * 3/1984 Ikenoya .................... F01N 3/22
60/290
9,737,850 B2 * 8/2017 Kimura .................. F01N 3/101
(Continued)

FOREIGN PATENT DOCUMENTS

JP   2008-25490 A   2/2008
JP   2011-106352 A  6/2011
(Continued)

OTHER PUBLICATIONS

International Search Report, issued in PCT/JP2016/053031, PCT/ISA/210, dated Mar. 15, 2016.
(Continued)

*Primary Examiner* — Joseph J Dallo
(74) *Attorney, Agent, or Firm* — Birch, Stewart, Kolasch & Birch, LLP

(57) ABSTRACT

A controlling device for purifying exhaust gas includes: a fuel cutting controller (2) that, if a predetermined condition for fuel cutting is satisfied, shuts off supply of fuel to an engine (10) after a predetermined delay time (B) elapses; a calculator (3) that calculates oxygen occludability of a catalyst (6, 7) being interposed in an exhaust system of the engine (10) and containing an oxygen occludable material; and a setter (4) that sets a length of the delay time (B) in accordance with the oxygen occludability calculated by the calculator (3).

12 Claims, 5 Drawing Sheets

(52) U.S. Cl.
CPC ...... *F02D 41/1454* (2013.01); *F01N 2550/02* (2013.01); *F01N 2900/1602* (2013.01); *F01N 2900/1621* (2013.01); *F02D 2200/0802* (2013.01)

(58) Field of Classification Search
CPC ............. F02D 41/14; F02D 2041/1431; F02D 2200/0802; F01N 2900/1621; F01N 2900/1602; F01N 2550/02; F01N 13/0093; F01N 9/00; F01N 3/101; F01N 11/007; F01N 11/002; F01N 3/20; F01N 3/28; F01N 2900/1624; F01N 2560/025; F01N 2900/08; F01N 2570/16; Y02T 10/47

See application file for complete search history.

(56) References Cited

U.S. PATENT DOCUMENTS

| | | | | |
|---|---|---|---|---|
| 2001/0053340 A1* | 12/2001 | Noda | ............ | B01D 53/945 423/213.2 |
| 2010/0050602 A1* | 3/2010 | Fujimoto | ............ | F01N 11/007 60/277 |
| 2010/0111789 A1* | 5/2010 | Fajardie | ............ | B01D 53/945 423/213.2 |
| 2011/0225951 A1* | 9/2011 | Sato | ............ | F02D 41/222 60/274 |
| 2012/0122667 A1* | 5/2012 | Matsueda | ............ | B01D 53/945 502/240 |
| 2013/0199161 A1* | 8/2013 | Aisaka | ............ | F01N 3/0864 60/276 |
| 2014/0318496 A1* | 10/2014 | Yoshida | ............ | F02D 41/123 123/332 |
| 2015/0086434 A1* | 3/2015 | Kimura | ............ | F01N 3/101 422/169 |

FOREIGN PATENT DOCUMENTS

| | | |
|---|---|---|
| JP | 2014-181623 A | 9/2014 |
| JP | 2015-10489 A | 1/2015 |

OTHER PUBLICATIONS

Written Opinion of the International Searching Authority, issued in PCT/JP2016/053031, PCT/ISA/237, dated Mar. 15, 2016.

* cited by examiner

CONTROLLING DEVICE FOR PURIFYING EXHAUST GAS PURIFYING

TECHNICAL FIELD

The present invention relates to a controlling device for purifying exhaust gas in a vehicle that interposes a catalyst containing an oxygen occludable material in an exhaust system of an engine.

BACKGROUND TECHNIQUE

A three-way catalyst containing an oxygen occludable material has conventionally been known as one of catalysts that are interposed in the exhaust systems of vehicles driven by the power of gasoline. A three-way catalyst simultaneously promotes reduction of oxygen nitride (NOx), oxidization of hydrocarbon (HnCm), and oxidization of carbon monoxide (CO) in an atmosphere close to the stoichiometric air-fuel ratio. An oxygen occludable material is a promotor having characteristics that adsorbs oxygen under a lean atmosphere, and releases the oxygen occluded during lean running under a rich atmosphere. Examples of an oxygen occludable material are Ceria ($CeO_2$), Ceria-Zirconia composite ($CeO_2$—$ZrO_2$), Almina-Ceria-Zirconia composite ($Al_2O_3$—$CeO_2$—$ZrO_2$), and composites of the above materials and second or third element components. Including the above oxygen occludable material in a catalyst easily maintain the oxygen concentration around the active site of the catalyst to the concentration near the stoichiometric air-fuel ratio. This ensures the air-fuel ratio to obtain preferable catalytic activity, so that the ability of the catalyst for purifying exhaust gas can be enhanced. The oxygen occluded on the oxygen occludable material is used in oxidization of hydrocarbon, carbon monoxide, and hydrogen (see Patent Literature 1).

PRIOR ART REFERENCE

Patent Literature

[Patent Literature 1] JP-A 2008-025490

SUMMARY

Problem to be Solved by Invention

On some engines equipped with the above catalyst interposed in the exhaust system, a control called fuel cutting is carried out. Fuel cutting is a control that temporarily stops the supply of fuel to the engine when a predetermined condition for fuel cutting is satisfied. This control is carried out during, for example, coasting or deceleration, and has a function for suppressing unnecessary fuel consumption. This means that execution of the fuel cutting can enhance the fuel consumption of a vehicle.

However, since external air flows in the exhaust system during the execution of the fuel cutting, an excessive amount of oxygen may sometimes be occluded on the oxygen occludable material of the catalyst. Such excessively occluded oxygen has possibility of lowering the ability of purifying exhaust gas when the engine is regained from the fuel cutting. In other words, since, when the engine is regained from the fuel cutting, an amount of oxygen releasing from the oxygen occludable material temporarily increases, the air-fuel ratio comes to a rather lean side, and therefore the ratio of purifying the nitrogen oxides easily lowers. In order to set the air-fuel ratio around the catalyst to the stoichiometric air-fuel ratio in consideration of the amount of oxygen to be released, the amount of injected fuel needs to be increased. Consequently, the total amount of injected fuel increases and therefore the effect of enhancing the fuel consumption due to fuel cutting may sometimes be cancelled.

If fuel cutting is not entirely carried out, oxygen is prohibited from being excessively occluded on the catalyst, so that high ability of purifying exhaust gas can be maintained. However, in this case, fuel is unnecessarily consumed during coasting and deceleration of the vehicle, leading to lowering of fuel consumption. Accordingly, not entirely carrying out fuel cutting is not a feasible solution. In contrast, instant fuel cutting that completes within less than ten seconds has a relatively small effect to enhance the fuel consumption, but has possibility of largely declining the ability of purifying the exhaust gas. Accordingly, it is preferable that the engine is controlled such that the above instant fuel cutting does not occur in order to enhance the ability of purifying the exhaust gas without impairing the effect of enhancing fuel consumption.

With the foregoing problem in view, the object of the present invention is to provide a controlling device for purifying exhaust gas that can enhance the fuel consumption, suppressing lowering of the capability of the catalyst for purifying the exhaust gas. In addition to the above object, effects and advantages that would be derived from the configuration described in the following "Embodiment to Carry out Invention] but that have not been attained from conventional technique can be regarded as other objects of the present invention.

Means to Solve the Problem (1) A controlling device for purifying exhaust gas, which is disclosed herein, includes: a fuel cutting controller that, if a predetermined condition for fuel cutting is satisfied, shuts off supply of fuel to an engine after a predetermined delay time elapses; a calculator that calculates oxygen occludability (e.g., an index value representing oxygen-occlusion ability) of a catalyst being interposed in an exhaust system of the engine and containing an oxygen occludable material; and a setter that sets a length of the delay time in accordance with the oxygen occludability calculated by the calculator.

An oxygen occludability represents a weight of oxygen to be occluded on the catalyst. For example, the oxygen occludability is the highest when the catalyst is new and lowers as the catalyst is used for a longer time.

(2) Preferably, the setter sets the delay time to be shorter as the oxygen occludability is lower. For example, the delay time is preferably set to be the longest when the catalyst is new and set to be shorter when the catalyst has been used for a longer time.

(3) The controlling device preferably further includes an upstream sensor that detects an oxygen concentration of an upstream side of the catalyst; and a downstream sensor that detects an oxygen concentration of a downstream side of the catalyst. With this configuration, the calculator preferably determines that the oxygen occludability is lower as an output inverting time representing a time period from a response time of the upstream sensor to a change of an air-fuel ratio to a response time of the downstream sensor to the change of the air-fuel ratio is shorter.

(4) The catalyst preferably includes an upstream catalyst disposed on an upstream side in the exhaust system and a downstream catalyst disposed on a downstream side in the exhaust system. The controlling device preferably further includes an intermediate sensor that detects an oxygen concentration between the upstream catalyst and the downstream catalyst. The calculator preferably determines that the oxygen occludability is lower as a second output inverting time representing a time period from a response time of the upstream sensor to a change of the air-fuel ratio to a response time of the intermediate sensor to the change of the air-fuel ratio is shorter.

(5) The calculator preferably calculates the oxygen occludability based on a degree of aged deterioration of the catalyst. For example, the oxygen occludability may be calculated on the basis of a time for which the catalyst is used (accumulated time for which the catalyst is used since the catalyst is new).

(6) The calculator preferably calculates the oxygen occludability when a condition that an operating state of the engine is stable for a predetermined time is satisfied. This means that "the operating state of an engine being stable for a predetermined time" is included in a condition for calculating the oxygen occludability.

(7) The calculator preferably calculates the oxygen occludability when a condition that temperature of the catalyst is within a predetermined temperature range. In other words, "the temperature of the catalyst being in the predetermined range" is included in a condition for calculating the oxygen occludability.

Effect of Invention

Setting an arbitrary delay time for the fuel cutting in accordance with the oxygen occludability of the catalyst makes it possible to adjust the amount of oxygen to be occluded on the catalyst, so that degrading of the ability of the catalyst for purifying the exhaust gas can be suppressed. Inhibiting oxygen from being excessively occluded can inhibit the burning air-fuel ratio of the engine from coming into a rich state, so that the fuel consumption can be improved.

EMBODIMENT TO CARRY OUT INVENTION

Hereinafter, description will now be made in relation to a controlling device for purifying exhaust gas of the present embodiment with reference to the accompanying drawings. The minimum configuration of controlling device for purifying exhaust gas can be achieved only by an engine controlling device 1 that is to be detailed below, but the controlling device for purifying exhaust gas may be achieved by an entire system including the engine controlling device 1 and the oxygen concentration sensors 15-17. The following embodiment is exemplary and does not intend to exclude various modification and application of technique not explicitly described in the following embodiment. The structures of the embodiment can be modified without departing from the scope of the embodiment, can be selected and omitted if required, and can be appropriately combined.

1. Configuration of the Device

Figure 1:
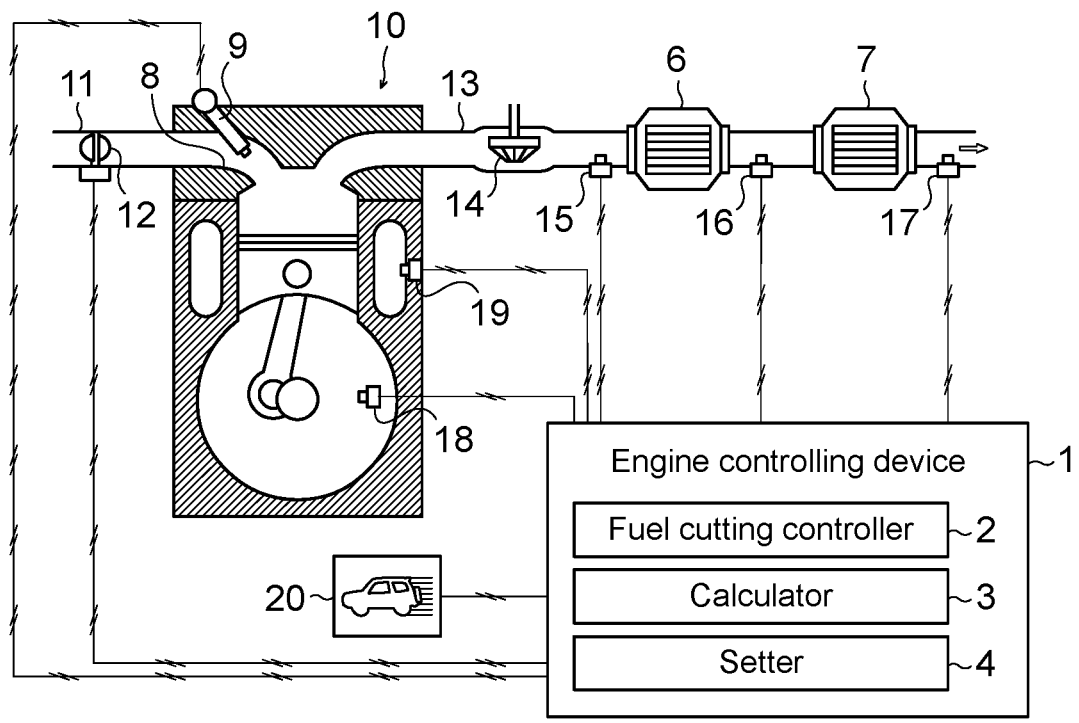
FIG. 1 is a diagram schematically illustrating a vehicle mounting thereon a controlling device for purifying exhaust gas.

FIG. 1 is a diagram schematically illustrating an engine 10 mounted on a vehicle and an engine controlling device 1 that controls the engine 10. The engine 10 includes a function of fuel cutting that temporarily stops fuel injection from an injector 9 provided in an intake port 8. On the intake air path 11 of the engine 10, a throttle valve 12 is interposed. In contrast, on an exhaust gas path 13, a turbine 14 of a supercharger, an upstream catalyst 6, and a downstream catalyst 7 are arranged in sequence from the upstream side.

Each of the upstream catalyst 6 and the downstream catalyst 7 is a three-way catalyst and therefore has a function of purifying nitrogen oxides, hydrocarbon, and carbon monoxide under the atmosphere close to the stoichiometric air-fuel ratio. The upstream catalyst 6 and the downstream catalyst 7 contain an oxygen occludable material such as Ceria-based material, Ceria-Zirconia-based material, and Almina-Ceria-Zirconia-based material. An oxygen occludable material adsorbs oxygen under the lean atmosphere and releases oxygen occluded during lean burning under the rich atmosphere. It should be noted that the upstream catalyst 6 contains a larger amount of noble metal than downstream catalyst 7.

On the exhaust gas path 13, oxygen sensors 15-17 that detect a concentration of oxygen contained in the exhaust gas are provided. Hereinafter, a sensor arranged upstream of the upstream catalyst 6 is also referred to as an upstream sensor 15; a sensor arranged between the upstream catalyst 6 and the downstream catalyst 7 is also referred to as an intermediate sensor 16; and a sensor arranged downstream of the downstream catalyst 7 is also referred to as a downstream sensor 17. Each of the upstream sensor 15, the intermediate sensor 16, and the downstream sensor 17 is a Zirconia $O_2$ sensor of switching outputting type that changes the sensor output V in digit, regarding the oxygen concentration corresponding to the stoichiometric air-fuel ratio as a threshold. This example assumes that the sensor output V when the air-fuel ratio is rich is a predetermined value $V_0$ and the sensor output V when the air-fuel ratio is lean is zero. Since the sensor output V of a Zirconia $O_2$ sensor fluctuate with temperature, the manner of the controlling may calibrate the sensor output V with the temperature of the exhaust gas. The sensor outputs V from the oxygen concentration sensors 15-17 are transmitted to the engine controlling device 1.

As illustrated in FIG. 1, an engine speed sensor 18 that detects an engine speed N (engine rotating speed) and a coolant temperature sensor 19 that detects the coolant temperature W of the coolant are provided to the engine 10. A vehicle speed sensor 20 that detects the vehicle speed S is provided to an arbitrary position of the vehicle. The information of an engine speed N, the coolant temperature W, and the vehicle speed S detected by these sensors 18-20 are transmitted to the engine controlling device 1. The information of the opening (throttle opening) of the throttle valve 12 is also transmitted to the engine controlling device 1.

The engine controlling device 1 (controlling device for purifying exhaust gas is a computer that entirely controls the engine 10, and is connected to a communication line of an on-board network. An example of the engine controlling device 1 include an electronic device (Electronic Controlling Unit (ECU)) in which a microprocessor such as a Central Processing Unit (CPU) and a Micro Processing Unit (MPU), a Read Only Memory (ROM), a Random Access Memory (RAM), and a non-volatile memory are integrated. A processor here is a processing device (processor) including, for example, a controlling unit (controlling circuit), a calculating unit (calculating circuit), and a cache memory (register). A ROM, a RAM, and a non-volatile memory are each memory device that stores programs and data used and obtained through operation. The contents to be executed in the engine controlling device 1 are recorded in the form of firmware and application programs in a ROM, a RAM, a non-volatile memory, or removable medium. While a program is being to be, the contents of the program is expanded in a memory space in the RAM and executed by the processor.

[2. Configuration of Control]

The engine controlling device 1 has a function of controlling the fuel cutting of the engine 10 in accordance with the oxygen occludability A of the catalysts 6, 7. In this example, when a condition for starting fuel cutting is satisfied, fuel supply from the injector 9 is not immediately shut off, but is shut off after a delay time B, which is set depending on the oxygen occludability A, elapses. In other words, if the condition for starting fuel cutting comes not to be satisfied before the delay time B elapses since the condition has been satisfied, the fuel cutting is not carried out. Consequently, instant fuel cutting shorter than the delay time B can be inhibited.

As the elements to exert the above control, the engine controlling device 1 is provided with a fuel cutting controller 2, a calculator 3, and a setter 4. These elements are part of the functions of programs executed by the engine controlling device 1, and are achieved by means of software. Alternatively, part or the entire of each function may be executed by means of hardware (electronic controlling circuit) or may be achieved by a combination of software and hardware.

[2-1. Fuel Cutting Controller]

The fuel cutting controller 2 is in charge of the fuel cutting of the engine 10, and carries out the fuel cutting in accordance with whether a predetermined condition for fuel cutting is satisfied or not satisfied. In this example, if a predetermined delay time B elapses since the predetermined condition for fuel cutting has been satisfied, control to shut off the fuel supply to the engine 10 is carried out. The condition for fuel cutting is, for example, satisfying all of the following four conditions 1-4. If the delay time B elapses during which all these conditions keep to be satisfied, the fuel cutting is started. If any one of the four conditions comes to be dissatisfied while the fuel cutting is being carried out, the fuel cutting is ended. If any one of the four conditions comes to be dissatisfied before the delay time B elapses, the fuel cutting is not carried out.

Four conditions of fuel cutting are:

1. the engine speed N is equal to or higher than a first speed $N_1$ and equal to or lower than a second speed $N_2$ ($N_1 \leq N \leq N_2$);

2. the throttle opening is fully closed (equal to or less than a predetermined opening);

3. the vehicle speed S is equal to or higher than a predetermined vehicle speed $S_1$ and equal to or lower than a predetermined vehicle speed $S_2$ ($S_1 \leq S \leq S_2$); and 4. the coolant temperature W is equal to or higher than a predetermined coolant temperature $W_1$ ($W_1 \leq W$).

[2-2. Calculator]

The calculator 3 calculates the oxygen occludability A of the catalysts 6, 7. An oxygen occludability A here represents the weight of oxygen to be occluded on the catalysts 6, 7. The oxygen occludability A has a characteristic of lowering as the catalysts 6, 7 deteriorate. For example, the oxygen occludability A is the highest when the catalysts 6, 7 are new and lowers as the catalysts 6, 7 are used for a longer time.

The calculator 3 of the present embodiment calculates the oxygen occludability A of the catalysts 6, 7 on the basis of the sensor outputs V from the respective oxygen concentration sensors 15-17 when the air-fuel ratio is changed. Specifically, the oxygen occludability A is calculates in accordance with the time period (output inverting time) from a response time of the upstream sensor 15 to a response time of the downstream sensor 17. Here, when the time period from the response time of the upstream sensor 15 to the response time of the downstream sensor 17 is shorter, the oxygen occludability A is determined to be lower and a smaller value is calculated for the oxygen occludability A.

When the time period (second output inverting time) from the response time of the upstream sensor 15 to a response time of the intermediate sensor 16 is shorter, the value of the oxygen occludability $A_U$ only of the upstream catalyst 6 is calculated to be smaller. In contrast, the oxygen occludability $A_D$ only of the downstream catalyst 7 is calculated by subtracting the oxygen occludability $A_U$ only of the upstream catalyst 6 from the total oxygen occludability A. Arranging the oxygen sensors 15-16 both on the upstream and downstream sides of the catalysts 6, 7 makes it possible to precisely calculate the oxygen occludability $A_U$ and $A_D$ of the catalysts 6, 7, respectively.

Here, the manner of calculating the oxygen occludability A will now be described with reference to FIGS. 2(A)-(C).

Figure 2A:
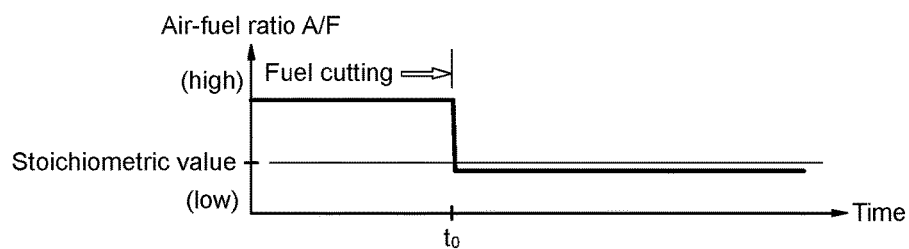
FIG. 2 is graphs describing a method for calculating the oxygen occludability of a catalyst; (A) describes change in air-fuel ratio when the engine is regained from fuel cutting; and (B) and (C) describe characteristics of output from an oxygen concentration sensor.
Figure 2B:
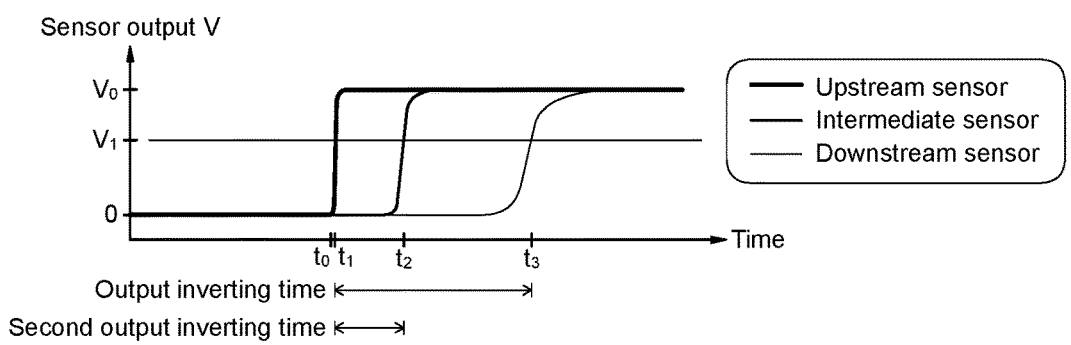
Figure 2C:
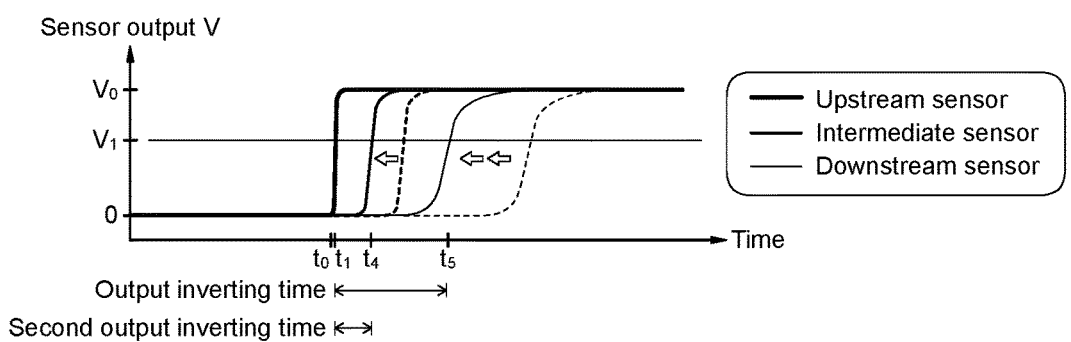

As illustrated in FIG. 2(A), the air-fuel ratio while the fuel cutting is being carried out is in a lean state. When the fuel cutting is finished and the engine 10 restarts burning at time $t_0$, the air-fuel ratio is controlled to be close to the stoichiometric value (e.g., a feedback target air-fuel ratio corresponding to a weak rich state). The fluctuation of the air-fuel ratio is detected in the form of fluctuations in oxygen concentrations detected by the oxygen concentration sensors 15-17. Since the upstream sensor 15 is disposed closer to the engine 10 than the remaining sensors 16, 17, the upstream sensor 15 outputs a predetermined value $V_0$ at time $t_1$ immediately after the time $t_0$. In contrast to the above, the intermediate sensor 16 is affected by oxygen released from the upstream catalyst 6 and outputs the predetermined value $V_0$ at time $t_2$ slightly later than the time $t_1$. The downstream sensor 17 is also affected by oxygen released from the downstream catalyst 7 and outputs the predetermined value $V_0$ at time $t_3$ further later than the time $t_2$. The change in sensor output V from each of the sensors 15-17 is described in FIG. 2(B).

If the oxygen occludability A degrades due to aged deterioration of the catalysts 6, 7, the amount of oxygen occluded on each of the catalysts 6, 7 reduces, so that the amount of oxygen released from each of the catalysts 6, 7 also reduces. Therefore, the response time t4 of the intermediate sensor 16 is earlier than the time $t_2$, which is the response time before the deterioration, as described in FIG. 2(C). Likewise, the response time $T_5$ of the downstream sensor 17 is earlier than the time $t_3$, which is the response time before the deterioration. Accordingly, if the times when the sensor outputs V from the intermediate sensor 16 and the downstream sensor 17 change from the time $t_1$ are shorter, the oxygen occludability A is determined to be lower. If the time $t_1$ can be regarded as substantially the same as time $t_0$, the degree of the oxygen occludability A can be determined on the output inverting time based on the time $t_0$. The information of the oxygen occludability A calculated here is transmitted to the setter 4.

The above description changes the air-fuel ratio from the lean state to a state close to the stoichiometric state at time $t_0$. A change in sensor output V can be detected likewise when the air-fuel ratio is changed from a state close to the stoichiometric state to a lean state. Accordingly, the oxygen occludability A can be grasped by, for example, observing a change in sensor outputs V at a time immediately after the start of the fuel cutting. The sensor outputs V from the sensors 15-17 at the air-fuel ratio under a state close to the stoichiometric state may be changed with the temperature. For the above, as described in FIGS. 2(B) and 2(C), a threshold $V_1$ smaller than the threshold $V_0$ is previously set, and the time when the sensor output V comes to be equal to or more than the threshold $V_1$ can be regarded as the response time.

[2-3. Setter]

The setter 4 sets the length of the delay time B in accordance with the oxygen occludability A calculated by the calculator 3. In the illustrated example, the delay time B is set in accordance with the total oxygen occludability A that the catalysts 6, 7 posses. In the present embodiment, higher total oxygen occludability A that the catalysts 6, 7 possess sets the delay time B to be longer and lower total oxygen occludability A that the catalysts 6, 7 possess sets the delay time B to be shorter. The relationship between the oxygen occludability A and the delay time B is described in FIG. 3.

Higher oxygen occludability A releases a larger amount of oxygen from the catalysts 6, 7 when the engine 10 is regained from the fuel cutting and the adverse effect on the ability of purifying exhaust gas comes to be large. In contrast, since a lower oxygen occludability A releases a smaller amount of oxygen released from the catalysts 6, 7, the ability of purifying the exhaust gas does not decline very much. For the above, setting the delay time B to be longer when the oxygen occludability A is higher can effectively inhibit lowering the ability of purifying the exhaust gas due to released oxygen.

The delay time B may be set using the oxygen occludability $A_U$ and $A_D$ of the catalysts 6, 7 calculated by the setter 3, respectively. The oxygen occludability $A_D$ of the downstream catalyst 7 can be obtained by subtracting the oxygen occludability $A_U$ of the upstream catalyst 6 from the total oxygen occludability A. In this case, a first delay time $B_U$ corresponding to the oxygen occludability $A_U$ of the upstream catalyst 6 is set; a second delay time BD corresponding to the oxygen occludability $A_D$ of the downstream catalyst 7 is also set; and the sum of the first delay time $B_U$ and the second delay time BD can also be calculated to be the delay time B. Considering the oxygen occludability $A_U$ and $A_D$ of the catalysts 6, 7, an appropriate delay time B conforming to the degree of the deterioration of each of the catalysts 6, 7, so that the total ability for purifying exhaust gas can be inhibited.

3. Flow Diagram

[3-1. Control of Fuel Cutting]

Figure 4:
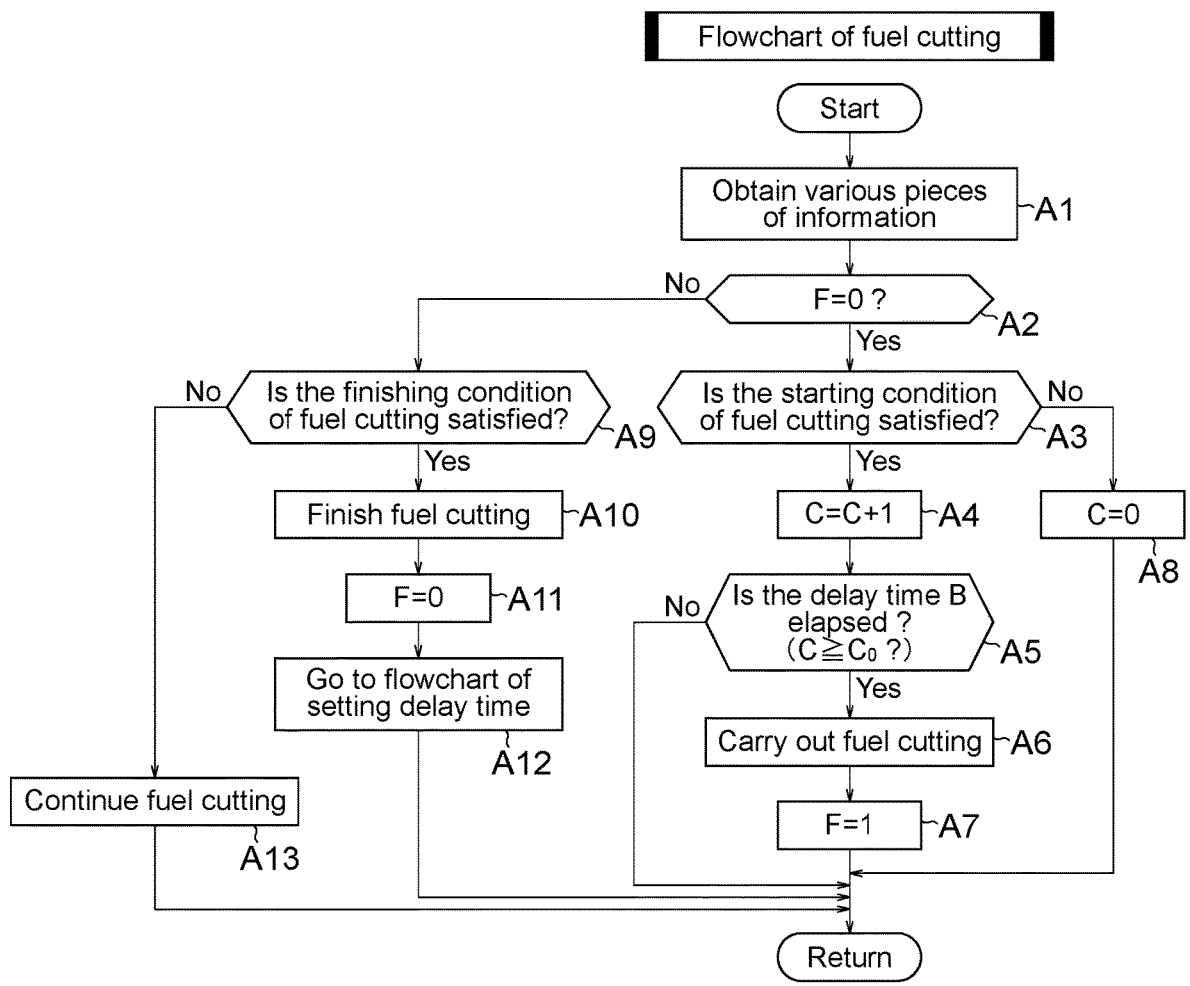
FIG. 4 is a flow diagram describing an example of a procedure of controlling fuel cutting.

FIG. 4 is a flow diagram illustrating a procedure of controlling fuel cutting. This flow is repeatedly carried out at regular intervals, for example, when the ignition key switch (main switch) of the vehicle is in the on state. A control flag F used in this flow represents the state of carrying out the fuel cutting and is set to F=1 while the fuel cutting is being carried out. The symbol C in the flow is a counter value corresponding to a time for which the condition for the fuel cutting is kept to be satisfied.

To begin with, various pieces of information to be used for determining the condition for the fuel cutting is obtained (Step A1), and, on the condition that the control flag F is F=0 (Step A2), whether the condition for starting the fuel cutting is satisfied is determined (Step A3). Here, if all of the above four conditions are satisfied, the value C+1 is substituted for the counter value C and measures the time elapsing (Step A4). In contrast, if at least one of the above four conditions is not satisfied, the counter value C is reset to C=0 (Step A8), and the control in this calculation cycle is terminated.

If the condition for starting the fuel cutting is kept to be satisfied, whether the time elapsed is equal to or longer than the delay time B is determined (Step A5). This determination is replaced with determination as to whether the counter value C is equal to or larger than the predetermined value $C_0$, which corresponds to the delay time B. If the time elapsed is equal to or longer than the delay time B, the fuel cutting controller 2 starts the fuel cutting, so that fuel supply to the engine 10 is shut off (Step A6). The control flag F is set to F=1 (Step A7), and the control in this calculation cycle is terminated.

While the fuel cutting is being carried out, when the control flag F satisfies F=1, determination whether a condition for finishing the fuel cutting is satisfied is made (Step A9). Here, if all of the above conditions 1-4 keep to be satisfied, the fuel cutting is continued (Step A13). In contrast, if at least one of the four conditions 1-4 comes to be dissatisfied, the fuel cutting is finished (Step A10). After Step A10, the control flag F is set to F=0 (Step A11), and the flow for setting the delay time B is started (Step A12) to finish the control of that calculation cycle.

[3-2. Setting of the Delay Time]

Figure 5:
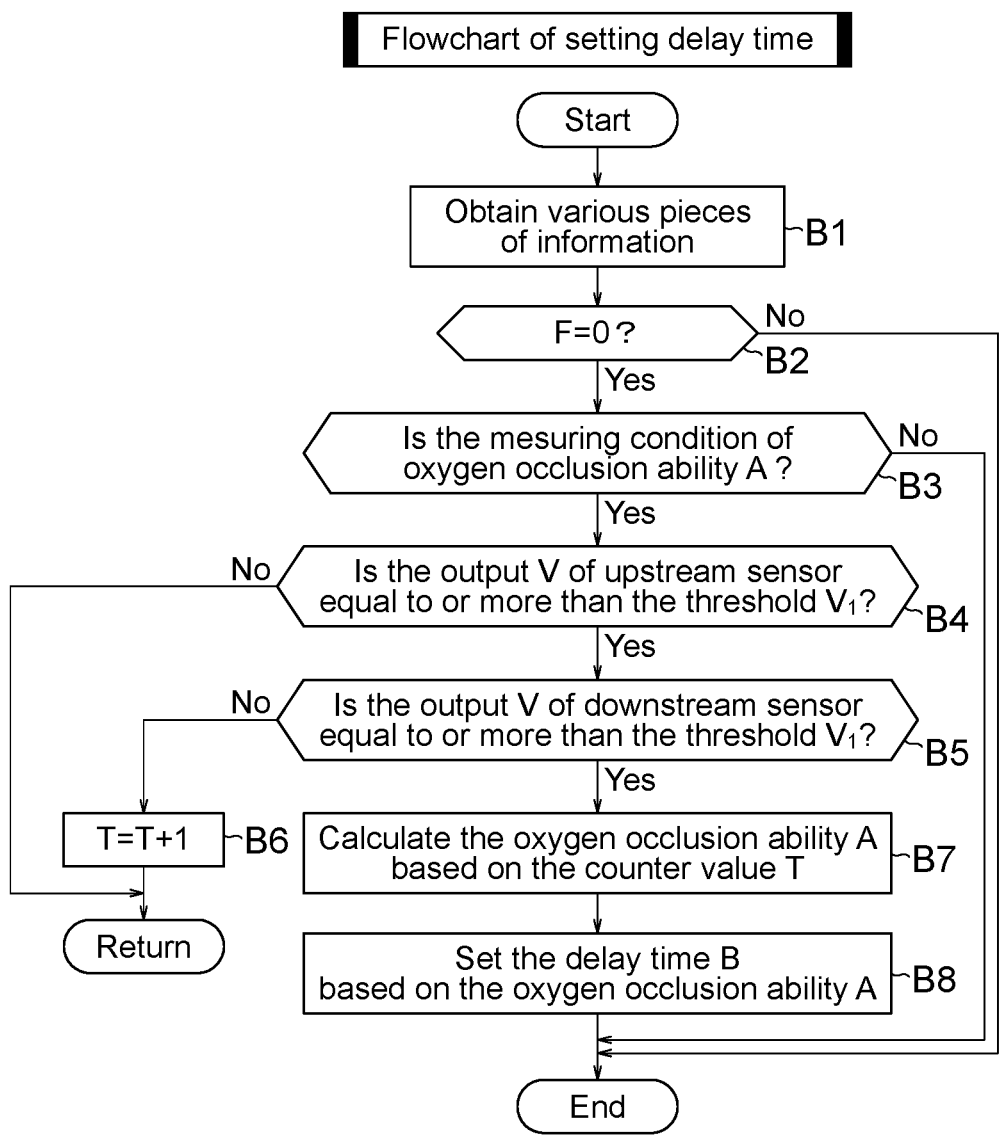
FIG. 5 is a flow diagram describing an example of a procedure of setting a delay time.

FIG. 5 is a flow diagram illustrating an example of the procedure of setting the delay time B. This flow is started immediately after the fuel cutting is finished and is carried out in parallel with the flow of FIG. 4 until the fuel cutting is restarted. The symbol T in the flow represents a counter value corresponding to the output inverting time of the downstream sensor 17.

To begin with, various pieces of information to be used for setting the delay time B is obtained (Step B1), and, on the condition that the control flag F is F=0 (Step B2), determination is made as to whether the running condition of the vehicle and the operating state of the engine 10 are in the state where the oxygen occludability A that the catalysts 6, 7 possess can be precisely measured (Step B3). For example, whether the running state of the vehicle and/or the operating state of the engine 10 stably continues is determined. Since the calculation precision of the oxygen occludability A of a catalyst changes, largely depending on the temperature of the catalysts, whether the temperature of the catalyst is within the designated temperature range (e.g., 400 degrees Celsius to 600 degrees Celsius) is determined. If the condition is determined to be satisfied in Step B3, the vehicle and the engine 10 are in the state where the oxygen occludability A that the catalysts 6, 7 possess can be precisely measured and the procedure proceeds to Step B4. In contrast, if the control flag F is set to F=1 in the flow of FIG. 4 carried out in parallel with this flow or if the condition is determined to be dissatisfied in Step B3, this flow is finished.

In Step B4, determination is made as to whether the sensor output V from the upstream sensor 15 is equal to or more than the threshold $V_1$. Here, if the sensor output V satisfies $V<V_1$, the control of this calculation cycle is finished. If the sensor output V satisfies $V≥V_1$, the procedure moves to step B5. In step B5, whether the sensor output V of the downstream sensor 17 is equal to or more than the threshold $V_1$ is determined. Here, if the sensor output V satisfies $V<V_1$, the value T+1 is substituted for the counter value T and the time elapsed is measured (Step B6). In contrast, the sensor output V satisfies $V≥V_1$, the calculator 3 calculates the oxygen occludability A of the catalysts 6, 7 on the basis of the counter value T at that time point (Step B7). The setter 4 sets the delay time B based on the oxygen occludability A (Step B8). The delay time B set in this flow is reflected on the contents (e.g., the predetermined value $C_0$) in the determination of Step A5 of FIG. 4.

4. Effect

Description will now be made in relation to the running state of the vehicle adopting thereto the above engine controlling device 1 with reference to FIGS. 6(A)-(E). When the acceleration pedal is released at the time $t_{10}$ and consequently, the throttle opening comes to be fully closed (FIG. 6(B)), the engine speed N gradually reduces (FIG. 6(D)) and also the vehicle speed S reduces (FIG. 6(E)). After that, when the engine speed comes to be equal to or lower than a second speed $N_2$ at time $t_{11}$, the condition for the fuel cutting is satisfied. Providing that the delay time B for the fuel cutting is not set, external air is introduced into the exhaust gas path 13 to increase the air-fuel ratio as illustrated by the broken line in FIG. 6(A) and consequently, a large amount of oxygen is occluded on the oxygen occluding material of the catalysts 6, 7. Accordingly, as illustrated by the broken line of FIG. 6(C), the ability of catalysts 6, 7 for purifying the exhaust gas immediately after the time t13, at which the fuel cutting is finished, so that the concentration of exhausted NOx temporarily rises.

Figure 6A:
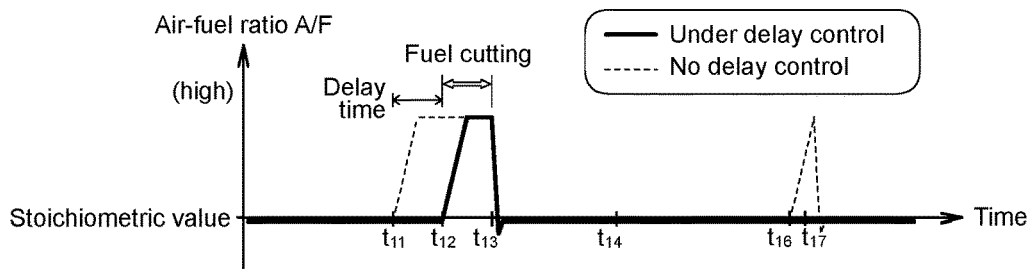
FIG. 6 is time charts describing effects and advantages of controlling made by a controlling device for purifying the exhaust gas; (A) describes an air-fuel ratio; (B) describes a throttle opening; (C) describes a concentration of exhausted NOx; (D) describes an engine speed; and (E) describes a vehicle speed.
Figure 6B:
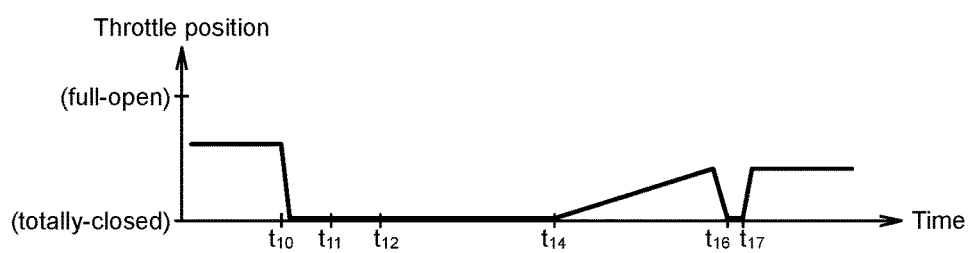
Figure 6C:
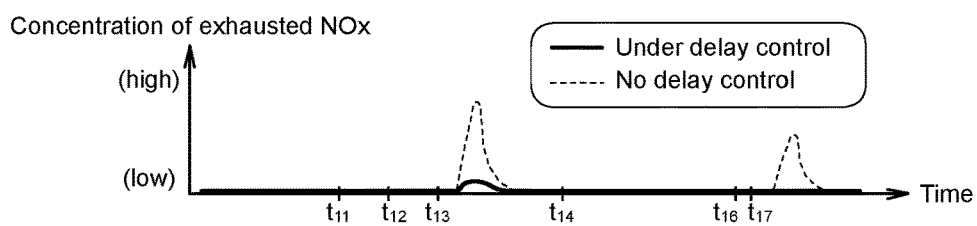
Figure 6D:
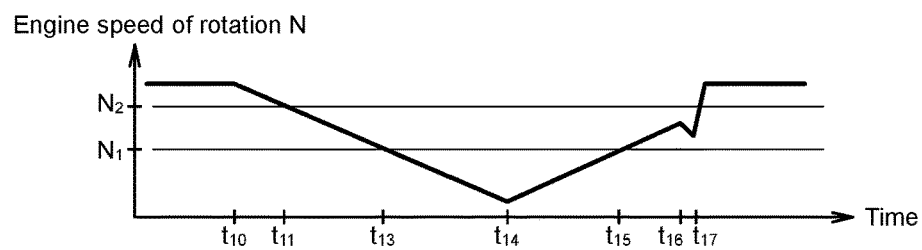
Figure 6E:
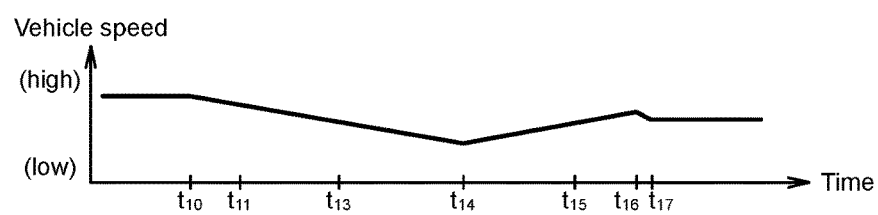

In contrast to the above, since the delay time B for the fuel cutting is set in the present embodiment, the fuel cutting is not started but is postponed at least the time period between the time $t_{11}$ and the time t12 at which the delay time B elapses from the time $t_{11}$. Thereby, as illustrated in FIG. 6(A), the time period for executing the fuel cutting is reduced by the delay time B, and consequently the amount of oxygen to be occluded onto the catalysts 6, 7 is reduced. Accordingly, as described by the solid line in FIG. 6(C), the ability of the catalysts 6, 7 for purifying the exhaust gas is improved as compared with the case where the delay time B is not set.

After that, the engine controlling device 1 behaves the same as the above when the condition for fuel cutting is satisfied again at time $t_{16}$. Specifically, the fuel cutting is not carried out but is postponed until the delay time B elapses. If the throttle opening is increased because the acceleration pedal is depressed during the delay time B, the condition for the fuel cutting comes to be dissatisfied and the fuel cutting is not started. Here, providing that the delay time B for fuel cutting is not set, instant fuel cutting, which finishes within not more than ten seconds, is generated as described by the broken line in FIG. 6(A). Thereby, as described by the broken line in FIG. 6(C), the ability for purifying the exhaust gas is degraded at and after the time $t_{17}$ at which the throttle opening starts to increase, and consequently, the concentration of exhausted NOx temporarily rises. In contrast to the above, such instant fuel cutting is inhibited and prohibited in the present embodiment. Accordingly, the ability of purifying the exhaust gas can be maintained not to be degraded at and after the time $t_{17}$, inhibiting the fuel consumption of the vehicle from worsening.

5. Advantages (1) If the condition for fuel cutting is satisfied, the above engine controlling device 1 (controlling device for purifying exhaust gas) sets the delay time B for stopping fuel supply to the engine 10 and consequently occurrence of instant fuel cutting can be avoided. This can reduce the opportunity that the oxygen is occluded on the catalysts 6, 7 and the time for executing the fuel cutting can be reduced. Thereby, the amount of oxygen occluded on the catalysts 6, 7 can be reduced, and decline in ability for purifying the exhausted gas after the engine 10 is regained from the fuel cutting can be suppressed. Since the fuel cutting is carried out after the delay time B elapses, unnecessary fuel consumption can be inhibited, so that fuel consumption can be improved. Consequently, the fuel consumption can be improved and decline in ability of the catalysts 6, 7 for purifying the exhaust gas is also suppressed.

In the above engine controlling device 1, the delay time B for the fuel cutting is set on the basis of the total oxygen occludability A of the catalysts 6, 7. Thereby, the time for shortening the execution of the fuel cutting can be determined, considering the amount of oxygen to be released from the catalysts 6, 7 after the fuel cutting is finished. Accordingly, decline in ability for purifying the exhausted gas after the engine 10 is regained from the fuel cutting can be precisely suppressed.

Figure 3:
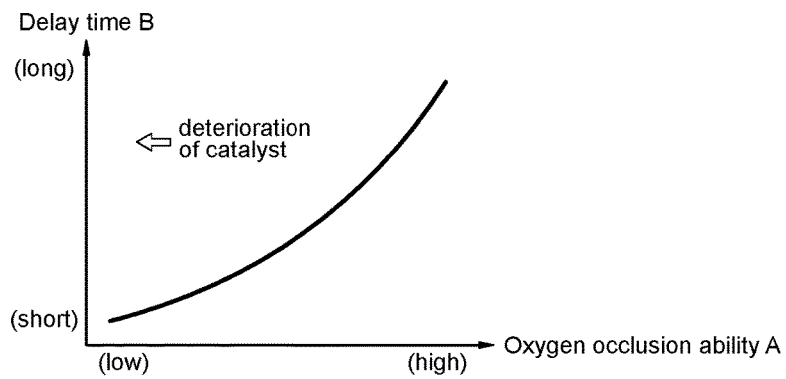
FIG. 3 is a graph describing a relationship between the ability of the catalyst for occluding oxygen and a delay time of fuel cutting.

As described in FIG. 3, for example, the above engine controlling device 1 sets a longer delay time B as the oxygen occludability A is higher and sets a shorter delay time B as the oxygen occludability A is lower. This setting is based on the fact that higher oxygen occludability A increases the amount of oxygen released from the catalysts 6 and 7 when the engine 10 is regained from the fuel cutting and thereby the adverse effect on the ability for purifying the exhaust gas increases. In other words, the delay time B is set to be longer as the oxygen occludability A is higher, so that the fuel cutting can be set not to be easily carried out and also the time for carrying out the fuel cutting can be shortened. Accordingly, the amount of oxygen to be released from the catalysts 6, 7 after the engine 10 is regained from the fuel cutting, and thereby the ability for purifying the exhaust gas can be improved.

(3) In the above engine controlling device 1, the oxygen occludability A is calculated on the basis of a difference in response time to the change in air-fuel ratio between the upstream sensor 15 disposed upstream of the catalysts 6, 7 and the downstream sensor 17 disposed downstream of the catalysts 6, 7. Here, the difference in response time corresponds to a time period (output inverting time) from the time $t_1$ to the time $t_3$ in FIG. 2(B). The total oxygen occludability A of the catalysts 6, 7 can be precisely grasped by determining that a shorter difference in response time represents lower oxygen occludability A. Thereby, the delay time B can be appropriately set and the ability of purifying the exhausted gas can be improved.

(4) Since the upstream catalyst 6 of the present embodiment contains a larger amount of catalytic noble metal than the downstream catalyst 7, the upstream catalyst 6 more affects the total ability of purifying the exhaust gas than the downstream catalyst 7. Considering the above contents, some cases may refer to the oxygen occludability $A_U$ only of the upstream catalyst 6 in place of referring to the total oxygen occludability A of the catalysts 6, 7. In order to fulfill this demand, the engine controlling device 1 can calculate the oxygen occludability $A_U$ of the upstream catalyst 6 using the intermediate sensor 16 interposed between the catalysts 6, 7. Specifically, the oxygen occludability $A_U$ of the upstream catalyst 6 is satisfactorily calculated by referring to the time (second output inverting time) from time $t_1$ to the time $t_2$ of FIG. 2(B) and determining that a shorter second output inverting time represents lower oxygen occludability $A_U$ of the upstream catalyst 6. The oxygen occludability $A_D$ of the downstream catalyst 7 is satisfactorily obtained by subtracting the oxygen occludability $A_U$ of the upstream catalyst 6 from the total oxygen occludability A. Using the individual oxygen occludability $A_U$ and $A_D$ can set an appropriate the delay time B for the fuel cutting and consequently, the ability of purifying the exhaust gas can be improved.

6. Modification

In the above embodiment, the exhaust system disposes two catalysts 6, 7 on the exhaust gas path 13, but the number of catalysts 6, 7 and the layout thereof are not limited to those of the embodiment. Likewise, the type of the catalysts 6, 7 is not limited to three-way catalysts and may alternatively a NOx occludable reduction catalyst or a selective NOx reduction catalyst having three-way catalytic function. The same is applied to the oxygen occludable material contained in the catalysts 6, 7.

In the above embodiment, the calculator 3 calculates the delay time B on the basis of the oxygen occludability A of the catalysts 6, 7, but may alternatively calculate the delay time B on the basis of another parameter. Since the easiness of oxygen to adsorb onto the oxygen occludable material has possibility of fluctuating depending on the temperature of the catalyst, the temperature of the exhaust gas, and the ambient temperature (external air temperature), the delay time B may be calibrated on the basis of the above temperatures.

The relationship between the oxygen occludability A and the delay time B is not limited to the relationship of FIG. 3. For example, since it can be estimated that lower oxygen occludability A represents more degrading of the ability of the catalysts 6, 7 for purifying the exhaust gas, one of the solution may be to shorten the time for the execution of the fuel cutting as much as possible so that the amount of released oxygen after the engine 10 is regained from the fuel cutting is reduced. In this case, setting the delay time B to be longer as the oxygen occludability A is lower can suppress the decline of the ability for purifying the exhaust gas due to the released oxygen.

The above embodiment uses four conditions for fuel cutting, but the specific condition for fuel cutting may be arbitrarily set. For example, any of the four examples can be arbitrarily combined. Further, the above control can be applied to fuel cutting (idling stop control) carried out while the vehicle is stopping in addition to the fuel cutting carried out while the vehicle is running. This alternative would bring the same effects as the foregoing embodiment at least by suppressing the occurrence of instant fuel cutting.

In the above embodiment, the oxygen occludability A is calculated on the basis of an output inverting time when the air-fuel ratio is changed from a lean state to a weak rich state (i.e., when the engine 10 is regained from the fuel cutting), but the manner of calculating the oxygen occludability A is not limited to this example. For example, the oxygen occludability A may be calculated on the basis of the cycle of vibration (frequency) of the oxygen detected at the downstream point of the catalysts 6, 7 when the air-fuel ratio is vibrated around the stoichiometric value. This vibration cycle comes to be shorter as the oxygen occludability A of the catalysts 6, 7 declines. The vibration frequency at a downstream point of the catalysts 6, 7 is changed so as to approach the vibration frequency of the upstream side as the oxygen occludability A declines. Accordingly, the vibration cycle (frequency) of the oxygen concentration and a ratio of vibration frequency between the upstream side and the downstream side can be used as indicators representing the oxygen occludability A.

DESCRIPTION OF REFERENCE NUMBERS/SYMBOLS

1 engine controlling device
2 fuel cutting controller
3 calculator
4 setter
6 upstream catalyst
7 downstream catalyst
10 engine
15 upstream sensor (upstream $O_2$ sensor)
16 intermediate sensor (intermediate $O_2$ sensor)
17 downstream sensor (downstream $O_2$ sensor)
18 engine speed sensor
19 coolant temperature sensor
20 vehicle speed sensor
A oxygen occludability
B delay time

The invention claimed is:

1. A controlling device for purifying exhaust gas comprising:
    a fuel cutting controller that, if a predetermined condition for fuel cutting is satisfied, shuts off supply of fuel to an engine after a delay time elapses;
    a calculator that calculates oxygen occludability of a catalyst being interposed in an exhaust system of the engine and containing an oxygen occludable material; and
    a setter that variously sets a length of the delay time in accordance with the oxygen occludability calculated by the calculator.

2. The controlling device according to claim 1, wherein the setter sets the delay time to be shorter as the oxygen occludability is lower.

3. The controlling device according to claim 1, further comprising:
    an upstream sensor that detects an oxygen concentration of an upstream side of the catalyst; and
    a downstream sensor that detects an oxygen concentration of a downstream side of the catalyst, wherein
    the calculator determines that the oxygen occludability is lower as an output inverting time representing a time period from a response time of the upstream sensor to a change of an air-fuel ratio to a response time of the downstream sensor to the change of the air-fuel ratio is shorter.

4. The controlling device according to claim 2, further comprising:
    an upstream sensor that detects an oxygen concentration of an upstream side of the catalyst; and a downstream sensor that detects an oxygen concentration of a downstream side of the catalyst, wherein the calculator determines that the oxygen occludability is lower as an output inverting time representing a time period from a response time of the upstream sensor to a change of an air-fuel ratio to a response time of the downstream sensor to the change of the air-fuel ratio is shorter.

5. The controlling device according to claim 3, wherein:

the catalyst comprises an upstream catalyst disposed on an upstream side in the exhaust system and a downstream catalyst disposed on a downstream side in the exhaust system;

the controlling device further comprises an intermediate sensor that detects an oxygen concentration between the upstream catalyst and the downstream catalyst; and the calculator determines that the oxygen occludability is lower as a second output inverting time representing a time period from a response time of the upstream sensor to a change of the air-fuel ratio to a response time of the intermediate sensor to the change of the air-fuel ratio is shorter.

6. The controlling device according to claim 4, wherein:

the catalyst comprises an upstream catalyst disposed on an upstream side in the exhaust system and a downstream catalyst disposed on a downstream side in the exhaust system;

the controlling device further comprises an intermediate sensor that detects an oxygen concentration between the upstream catalyst and the downstream catalyst; and the calculator determines that the oxygen occludability is lower as a second output inverting time representing a time period from a response time of the upstream sensor to a change of the air-fuel ratio to a response time of the intermediate sensor to the change of the air-fuel ratio is shorter.

7. The controlling device according to claim 1, wherein the calculator calculates the oxygen occludability based on a degree of aged deterioration of the catalyst.

8. The controlling device according to claim 2, wherein the calculator calculates the oxygen occludability based on a degree of aged deterioration of the catalyst.

9. The controlling device according to claim 1, wherein the calculator calculates the oxygen occludability when a condition that an operating state of the engine is stable for a predetermined time is satisfied.

10. The controlling device according to claim 2, wherein the calculator calculates the oxygen occludability when a condition that an operating state of the engine is stable for a predetermined time is satisfied.

11. The controlling device according to claim 1, wherein the calculator calculates the oxygen occludability when a condition that temperature of the catalyst is within a predetermined temperature range.

12. The controlling device according to claim 2, wherein the calculator calculates the oxygen occludability when a condition that temperature of the catalyst is within a predetermined temperature range.

* * * * *